(12) United States Patent  (10) Patent No.: US 7,799,388 B2
Sabouni et al.  (45) Date of Patent: *Sep. 21, 2010

(54) MECHANICAL SEALS AND METHOD OF MANUFACTURE

(75) Inventors: Omar Sabouni, South Windsor, CT (US); Jacobus Doesburg, Edmonton (CA); Richard Karl Schmid, Melville, NY (US); Thomas H. Piquette, Avon, CT (US); David Gollob, Simsbury, CT (US)

(73) Assignee: Sulzer Metco Venture, LLC, Elmwood, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/732,273

(22) Filed: Apr. 3, 2007

(65) Prior Publication Data

US 2007/0275267 A1 Nov. 29, 2007

Related U.S. Application Data

(60) Provisional application No. 60/808,871, filed on May 26, 2006.

(51) Int. Cl.
*C23C 4/10* (2006.01)
*C23C 4/04* (2006.01)

(52) U.S. Cl. ............... 427/450; 427/452; 427/595; 427/596; 427/422

(58) Field of Classification Search ............ 427/450
See application file for complete search history.

(56) References Cited

U.S. PATENT DOCUMENTS

| | | | |
|---|---|---|---|
| 3,019,128 A | 1/1962 | Smiley | |
| 3,086,782 A | 4/1963 | Peickii | |
| 3,095,316 A | 6/1963 | Hartwig | |
| 3,348,929 A | 10/1967 | Valtschev et al. | |
| 3,440,079 A | 4/1969 | Jensen | |
| 3,450,545 A | 6/1969 | Ballard et al. | |
| 3,617,358 A * | 11/1971 | Dittrich | 427/447 |
| 3,839,618 A * | 10/1974 | Muehlberger | 219/121.47 |
| 3,840,350 A | 10/1974 | Tucker | |
| 3,920,468 A | 11/1975 | Brown et al. | |
| 4,226,914 A * | 10/1980 | Terner et al. | 428/446 |
| 4,288,495 A | 9/1981 | Terner et al. | |
| 4,485,143 A | 11/1984 | Inoue et al. | |

(Continued)

FOREIGN PATENT DOCUMENTS

BE 510038 * 4/1952

(Continued)

OTHER PUBLICATIONS

Wielage, et al., Manufacture of SiC Composite Coating by HVOF, Thermal Spray 2001: New Surfaces for a New Millennium, (Ed.) C.C. Berndt, K.A. Khor, and E.F. Lugscheider, Published by ASM International, Materials Park, Ohio, USA, 2001.

(Continued)

*Primary Examiner*—Katherine A Bareford
(74) *Attorney, Agent, or Firm*—Florek & Endres PLLC

(57) ABSTRACT

A mechanical seal structure and a method for manufacture that employs at least one ceramic seal face prepared by a thermal spray process.

26 Claims, 1 Drawing Sheet

U.S. PATENT DOCUMENTS

| | | | |
|---|---|---|---|
| 4,627,896 A | | 12/1986 | Nazmy et al. |
| 4,755,220 A | | 7/1988 | Woditsch et al. |
| 4,800,065 A | | 1/1989 | Christodoulou et al. |
| 4,962,069 A | | 10/1990 | Burns et al. |
| 5,017,527 A | * | 5/1991 | June-Gunn et al. ............ 501/90 |
| 5,039,629 A | | 8/1991 | Kakligian |
| 5,049,450 A | | 9/1991 | Dorfman et al. |
| 5,173,367 A | | 12/1992 | Liimatta et al. |
| 5,179,048 A | | 1/1993 | Niebylski |
| 5,236,638 A | | 8/1993 | Schulten et al. |
| 5,302,450 A | | 4/1994 | Rao et al. |
| 5,332,601 A | | 7/1994 | Varacalle et al. |
| 5,358,753 A | | 10/1994 | Rao et al. |
| 5,457,151 A | | 10/1995 | Graef et al. |
| 5,484,662 A | | 1/1996 | Rao |
| 5,506,055 A | | 4/1996 | Dorfman et al. |
| 5,629,091 A | | 5/1997 | Rao et al. |
| 5,640,666 A | | 6/1997 | Jayashankar et al. |
| 5,837,048 A | | 11/1998 | Kelley |
| 5,861,445 A | | 1/1999 | Xu et al. |
| 5,897,921 A | * | 4/1999 | Borom et al. ............... 427/454 |
| 5,932,293 A | | 8/1999 | Belashchenko et al. |
| 6,110,268 A | | 8/2000 | Gross et al. |
| 6,340,497 B2 | | 1/2002 | Wilson et al. |
| 6,436,480 B1 | | 8/2002 | Upadhya |
| 6,491,971 B2 | | 12/2002 | Costantini et al. |
| 6,610,370 B2 | | 8/2003 | Wang et al. |
| 2002/0058576 A1 | | 5/2002 | Mazany et al. |
| 2003/0003328 A1 | | 1/2003 | Spitsberg et al. |
| 2003/0003329 A1 | | 1/2003 | Wang et al. |
| 2003/0159619 A1 | | 8/2003 | Noguchi et al. |
| 2003/0180565 A1 | | 9/2003 | Herbst-Dederichs |
| 2003/0190413 A1 | | 10/2003 | Van Steenkiste et al. |
| 2003/0198749 A1 | | 10/2003 | Kumar et al. |
| 2003/0207142 A1 | * | 11/2003 | Giesler et al. ............... 428/564 |
| 2004/0071896 A1 | | 4/2004 | Kang et al. |
| 2004/0151840 A1 | | 8/2004 | Wang et al. |
| 2004/0173948 A1 | | 9/2004 | Pandelisev |
| 2004/0258916 A1 | | 12/2004 | Tului et al. |
| 2006/0213326 A1 | * | 9/2006 | Gollob et al. ................. 75/252 |

FOREIGN PATENT DOCUMENTS

| | | | |
|---|---|---|---|
| DE | 2028050 | | 12/1971 |
| DE | 3721008 | | 10/1988 |
| DE | 10324713 | | 12/2004 |
| EP | 0005632 | | 11/1979 |
| EP | 0166676 | | 2/1986 |
| EP | 0232919 | | 8/1987 |
| EP | 0459114 | | 12/1991 |
| EP | 0771884 | | 5/1997 |
| EP | 1126043 | | 8/2001 |
| EP | 1518622 | | 3/2005 |
| EP | 1792677 | | 6/2007 |
| FR | 2575185 | | 6/1986 |
| GB | 1263859 | | 2/1972 |
| GB | 2062600 | * | 5/1981 |
| JP | 59064766 | | 4/1984 |
| JP | 60089557 | | 5/1985 |
| JP | 60103169 | | 6/1985 |
| JP | 63218272 | | 9/1988 |
| JP | 10088311 | | 4/1998 |
| JP | 2005015874 | | 1/2005 |
| WO | WO9616918 | | 6/1996 |
| WO | WO 2006/104737 | | 5/2006 |
| WO | WO2006104737 | | 5/2006 |
| WO | WO 2007/108793 | | 9/2007 |
| WO | WO2007108793 | | 9/2007 |

OTHER PUBLICATIONS

International Search Report and Written Opinion for PCT/US2006/009912.

International Search Report and Written Opinion for PCT/US2006/009962.

International Search Report and Written Opinion for PCT/US07/08442.

* cited by examiner

MECHANICAL SEALS AND METHOD OF MANUFACTURE

CROSS REFERENCE TO RELATED APPLICATION

This application claims the benefit of provisional patent application Ser. No. 60/808,871 filed on May 26, 2006.

MECHANICAL SEALS AND METHOD OF MANUFACTURE

The present invention relates to a mechanical seal structure and a method for manufacturing the mechanical seal structure. The mechanical seal structure of the present invention comprises a core or substrate and a ceramic/metal matrix or ceramic layer or seal face. The seal face is applied to the substrate by the process described in U.S. patent application Ser. No. 11/091,879 filed on Mar. 25, 2005 (corresponding to PCT/US06/09912, published as WO 2006/104737), published as US PG Publication US 2006/0213326, and Patent Cooperation Treaty Application No. PCT/US06/09962 filed on Mar. 20, 2006, published as WO 2006/108793, both of which are incorporated herein by reference.

BACKGROUND OF THE INVENTION

Mechanical seals are structures designed to prevent leakage between a rotating shaft and its housing under conditions of extreme pressure, shaft speed and temperature. Typically mechanical seals comprise a stationary part and a rotating part. Mechanical seals are commonly used in pumps. A critical part of a mechanical seal is the seal faces. The seal face is the surface or point where the rotating part of the mechanical seal and the stationary part of the mechanical seal meet and interact. Because of the harsh conditions encountered at the seal faces a wide variety of materials are chosen for the seal faces. Commonly used materials are hardened steels, aluminum oxide, tungsten carbide, and silicon carbide. The precise material chosen will depend on the application and economic considerations.

The stationary part of the mechanical seal and the rotating part of the mechanical seal may be manufactured from the same material or different materials. A commonly used pairing for demanding applications is silicon carbide against silicon carbide or silicon carbide against graphite. The silicon carbide employed in these known applications is generally a sintered form or a reaction bonded form depending upon the particular application. Although these silicon carbide products accomplish the goal of creating a seal, they are expensive and time consuming to manufacture. In addition, these known mechanical seals are often prone to rapid failures that can quickly damage the pump or components of the device employing the mechanical seal.

It is an object of the present invention to provide a mechanical seal structure wherein in at least one seal face of the mechanical seal structure is a ceramic layer prepared by thermal spray techniques.

It is a further object of the present invention to provide a mechanical seal structure wherein both seal faces of the mechanical seal structure are a ceramic layer prepared by thermal spray techniques.

It is still a further object of the present invention that the substrate of the mechanical seal is a more compliant material such as graphite than the ceramic seal face layer to delay catastrophic seal failure and potential catastrophic damage, to the device employing the mechanical seal if and when the ceramic seal face fails or malfunctions.

It is yet another object of the present invention to provide a mechanical seal that is inexpensive to manufacture and can be manufactured in a relatively short time period.

The above-identified objects and other objects of the present invention are achieved by the subject matter characterized by the features of the claims.

SUMMARY OF THE INVENTION

The present invention is a mechanical seal structure that comprises a substrate and at least one ceramic seal face wherein the ceramic seal face is prepared by a thermal spray technique comprising the steps of (a) feeding a ceramic component that sublimes and a metallic or semi-conductor material that does not sublime into a thermal spray apparatus, (b) spraying the ceramic component and the metallic or semi-conductor material onto a substrate, whereby the ceramic component and the metallic or semi-conductor material deposit on the surface of the substrate to form a ceramic seal face, and (c) keeping the metallic or semi-conductor material on the substrate surface plastic during spraying at least in the region where the metallic or semi-conductor material actually strikes the surface. The ceramic seal face may be applied to the stationary part of the mechanical seal, the rotating part of the mechanical seal or both the stationary part and the rotating part of the mechanical seal.

In another embodiment of the present invention the mechanical seal is a slide bearing and the ceramic seal face is applied to the stationary part of the slide bearing, the rotating part of the slide bearing or both the stationary part and the rotating part of the slide bearing The wording "a ceramic that sublimes" or "a ceramic component that sublimes" and the like shall designate all ceramic materials that do not melt but sublime in the pressure range in which thermal spray processes usually are performed. Said pressure range is typically 0 bar to 5 bar. The wording shall not mean that the ceramic component has to sublime during the thermal spray process. However, if one were to increase the temperature high enough in the pressure range 0 to 5 bar the ceramic material used for the invention would not melt but directly change from the solid to the gaseous state or decompose or otherwise degrade. Thus, the wording "a ceramic that sublimes" shall distinguish the ceramic materials used for the invention over other ceramic materials that do melt in the pressure range of 0 to 5 bar if the temperature is sufficiently increased.

In an analogous manner the wording "a metallic or semi-conductor material that does not sublime" or the like shall designate any metallic or semi-conductor material that does melt in the pressure range of 0-5 bar if the temperature is sufficiently high.

It is an essential feature of the invention that the metallic or semi-conductor material remains plastic or soft after deposition on the substrate in order to receive the hard particles of the ceramic component. Thus, the metallic or semi-conductor material on the surface constitutes a soft or plastic layer, in which the hard particles of the ceramic component are embedded.

The step of keeping plastic the metallic or semi-conductor material may comprise a controlled heating of the surface by means of a thermal spray beam generated by the thermal spray apparatus. For example, when a plasma spray apparatus is used as thermal spray apparatus the plume of the plasma gun can be used to heat the surface of the substrate to the desired temperature. The control is performed by adjusting the power of the plasma gun.

In addition or alternatively, the step of keeping plastic the metallic or semi-conductor material may involve transferring heat from an additional heat source to the substrate and/or the surface. Such heating devices are based, for example, on electrical heating or radiation heating are known in the art.

In order to achieve a good wetting or embedding of the ceramic component particles it is advantageous keeping the metallic or semi-conductor material on the surface at a temperature which is at least 0.75 times the melting temperature in Kelvin of the metallic or semi-conductor material, preferably at least 0.8 times the melting temperature in Kelvin.

In order to avoid a considerable flowing of the metallic or semi-conductor material it is advantageous to keep the metallic or semi-conductor material of the surface at a temperature which is at most 100 K above the melting temperature of the metallic or semi-conductor material, preferably at most 50 K above the melting temperature.

According to an embodiment of the present invention, the formation of the ceramic seal face comprises of the step of forming a free flowing agglomerate comprising of (i) the ceramic component that sublimes, (ii) the metallic or semi-conductor material that does not sublime and (iii) a binder prior to the feeding into the thermal spray apparatus, i.e. prior to feeding the materials into the thermal spray apparatus a thermal spray feedstock composition comprising free flowing agglomerates is generated. The agglomerates comprise of at least the ceramic component, the metallic or semi-conductor material and a binder. By forming the agglomerates prior to the thermal spraying a better deposition on the substrate is achieved.

The materials fed into the thermal spray apparatus or the agglomerates, respectively, may also contain other components depending upon the properties or use desired for the final ceramic seal face.

The agglomerates can be of any shape such as spherical, cylindrical, angular, irregular, or combinations thereof. The size distribution of the agglomerates will vary depending upon the type of thermal spray apparatus employed. It is important that the agglomerates form a free flowing composition that can be fed into a thermal spray apparatus. For example, a free flowing material can be established according to ASTM B213-03, which is incorporated herein by reference.

The particle size of the components of the agglomerates, i.e the ceramic that sublimes, the metallic or semi-conductor material that does not sublime, and the binder, should be smaller than the average particle size of the agglomerates.

The agglomerates can be formed by mixing the ceramic that sublimes, the metallic or semi-conductor material that does not sublime, the binder, and any other desired component with or without a granulation fluid or liquid to form free flowing agglomerates. If a granulation fluid is employed, the granulation fluid may be water, an organic solvent or a combination of water and an organic solvent. The granulation fluid should be removed during or after the formation of the agglomerate, however, limited or residual amounts may remain in the agglomerates as long as the powder remains free flowing.

The agglomerate can also be formed by dry methods such as by compression of the ceramic that sublimes, the metallic or semi-conductor material that does not sublime, the binder and any other desired component followed by subsequent milling or sieving step to break the compressed mass into smaller free flowing agglomerates.

Once the free flowing agglomerates are formed, they can be fed into a thermal spray apparatus and sprayed onto a substrate to form the ceramic seal face.

In one embodiment, the materials fed to the thermal spray apparatus or the agglomerates, respectively, are sprayed onto the desired substrate in a controlled atmosphere, preferably but not necessarily a primarily oxygen free atmosphere, such as a nitrogen or argon rich atmosphere. The resulting ceramic seal face exhibits a relatively uniform or homogeneous distribution of the ceramic that sublimes and the metallic or semi-conductor material that does not sublime.

According to another embodiment the spraying is conducted at low pressure between 0.0001 bar and 1 bar.

DETAILED DESCRIPTION OF THE INVENTION

Figure 1:
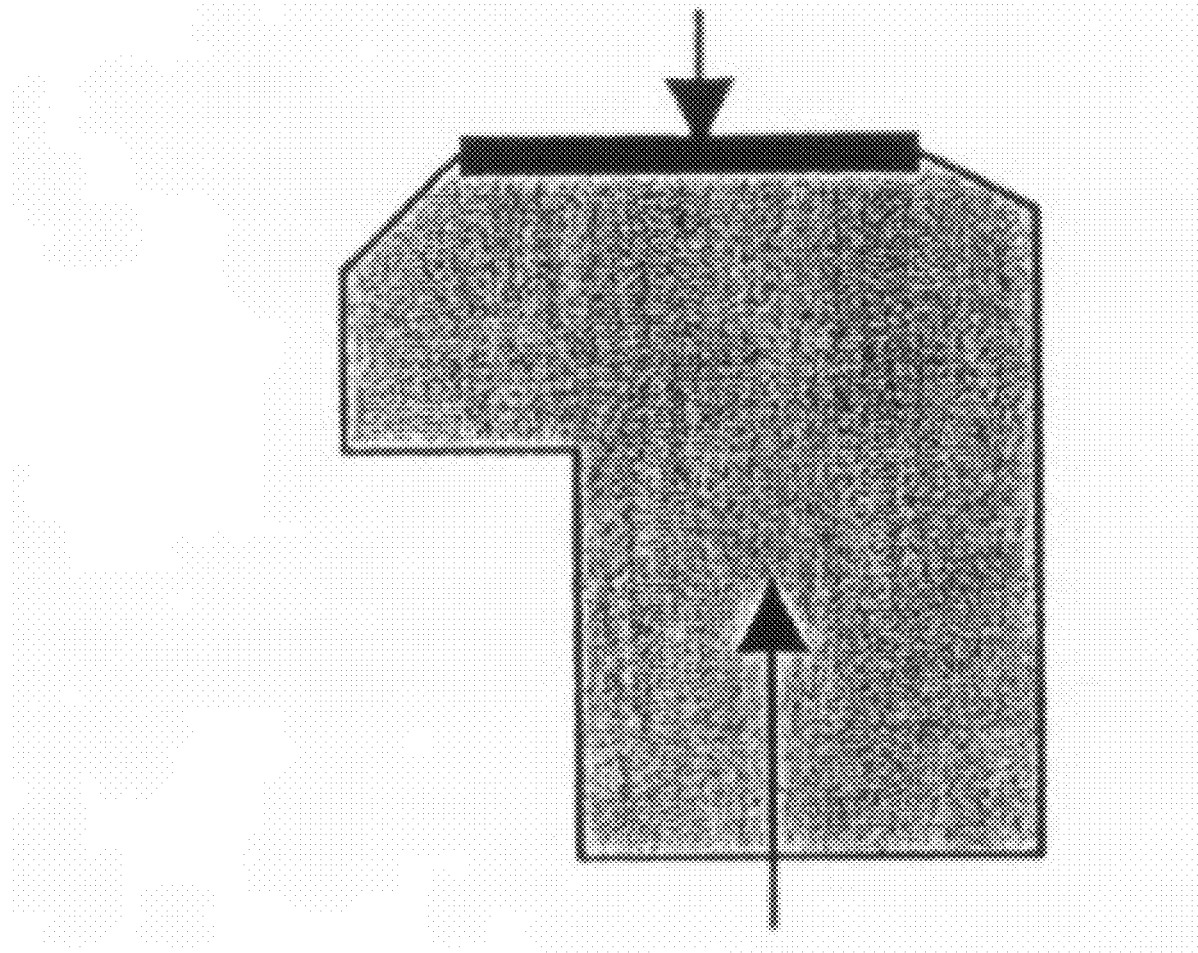
FIG. 1 is a partial schematic cross section of a preferred embodiment of the present invention.

In the following section the invention will be described in more detail referring to preferred embodiments of the invention.

According to the invention a mechanical seal structure is formed which comprises a substrate and at least one ceramic seal face applied to the substrate by thermal spray techniques. The ceramic seal face can be applied to the stationary part of the mechanical seal structure, the rotating part of the mechanical seal structure or both the stationary part and the mechanical part of the mechanical seal structure. Shown in FIG. 1 is a Si/SiC seal of the present invention.

The substrate is created by formed by conventional manufacturing techniques commonly known in the art such as machining, milling or casting. Typically the substrate is formed to near final dimensions prior to the application of the ceramic seal face. The substrate material will vary depending upon the application and environment in which the mechanical seal will be used. Some desirable properties of the substrate material are:

1. a coefficient of thermal expansion that is in the same range, i.e. ±10%, preferably ±5, as the ceramic seal face coating;
2. a high thermal conductivity in order to move heat away from the ceramic seal face coating and keep the ceramic seal face cool, thereby maximizing performance; and
3. an ability to withstand temperatures up to 1000° C. during manufacture.

Some of the preferred substrate materials are:
1. Graphite;
2. Silicon carbide, silicon-silicon carbide, silicon, silicon nitride, silicon boride and silicon oxide in either crystalline or amorphous states;
3. Carbon fibre, matte, roven woven and similar materials;
4. Buckministerfullerines and nanotubes;
5. Materials 1 through 4 impregnated with silicon;
6. Materials 1 through 4 impregnated with epoxy or any other thermosetting material;
7. Molybdenum or tungsten;
8. Mullite;
9. Aluminum oxide or zirconium oxide;
10. Tungsten carbide or tungsten carbide in a metal matrix such as cobalt and/or nickel and their alloys;
11. Other carbides such as but not limited to boron carbide, aluminum carbide, vanadium carbide, niobium carbide, tantalum carbide, zirconium carbide, hafnium carbide, chromium carbide or molybdenum carbide in matrices consisting of nickel, cobalt, iron, aluminum, titanium, copper, molybdenum and their alloys;

12. Other nitrides, such as but not limited to boron nitride, aluminum nitride, vanadium nitride, niobium nitride, tantalum nitride, zirconium nitride, hafnium nitride, chromium nitride or molybdenum nitride in matrices consisting of nickel, cobalt, iron, aluminum, titanium, copper molybdenum and their alloys; and 13. Other borides, such as but not limited to aluminum boride, vanadium boride, niobium boride, tantalum boride, zirconium boride, hafnium boride, chromium boride or molybdenum boride in matrices consisting of nickel, cobalt, iron, aluminum, titanium, copper molybdenum and their alloys.

The most preferred substrate materials are graphite or carbonaceous base materials.

The ceramic seal face of the mechanical seal structure is formed by feeding a ceramic component that sublimes and a metallic or semi-conductor material that does not sublime into a thermal spray apparatus, spraying the ceramic component and the metallic or semi-conductor material onto a substrate, whereby the ceramic component and the metallic or semi-conductor material deposit on the surface of the substrate and keeping plastic the metallic or semi-conductor material of the surface during spraying at least in the region where the metallic or semi-conductor material actually strikes the surface.

With respect to the feeding of the ceramic component and the metallic or semi-conductor material into the thermal spray apparatus several embodiments are possible.

According to a first embodiment, a powder of the ceramic component and a powder of the metallic or semi-conductor material are blended and the blend of the powders is fed to the thermal spray apparatus. Of course, it is possible that the blend contains additional components as will be described hereinafter.

According to another embodiment the ceramic component and the metallic or semi-conductor material are separately fed to the thermal spray apparatus. It is possible, that both components are mixed or blended within the thermal spray apparatus for example shortly before entering the spraying process. It is also possible to use two separate feeders or a feeder having two separate channels and to separately introduce the components into the spraying process, for example into the plasma generated by a plasma gun. It is still another possibility to first introduce one of the components, for example the metallic or semi-conductor component, into the thermal spray process, for example the plasma of a plasma gun, and to introduce the other component in the plasma gas stream later on, for example when the metallic or semi-conductor material is already softened. Of course, it is possible that additional components are used for the spraying process as will be described hereinafter.

According to the most preferred embodiment the method comprises the step of forming a free flowing agglomerate comprising (i) the ceramic component that sublimes, (ii) the metallic or semi-conductor material that does not sublime and (iii) a binder prior to the feeding into the thermal spray apparatus, i.e. prior to feeding the materials into the thermal spray apparatus a thermal spray feedstock composition comprising free flowing agglomerates is generated.

In the following reference is made to this preferred embodiment. However, it is pointed out that the explanations and examples given also hold in an analogous manner for those embodiments where no agglomerates are formed prior to feeding the materials to the thermal spray apparatus.

The ceramic component of the agglomerates can comprise particles having a mono-modal or multi-modal size distribution that is smaller than the average size distribution of the agglomerate. Typical ceramic particle sizes range from about 0.1 μm to about 200 μm, preferably about 1 μm to about 100 μm. Some of the preferred ceramics are carbides, borides, nitrides or combinations of the foregoing, many of which sublime. Some specific examples of the ceramics that sublime include silicon carbide, zirconium boride, niobium boride, silicon nitride, boron nitride, aluminum nitride and tantalum nitride or combinations thereof.

The preferred ceramic is silicon carbide (SiC). This material is commercially available. Other ceramics are known to individuals of ordinary skill in the art such as those described in U.S. Pat. No. 6,436,480 and United States Published Patent Application Nos. 2003/0159619 and 2003/0180565 which are incorporated herein by reference.

Like the ceramic component discussed above, the metallic or semi-conductor material that does not sublime, (sometimes referred to in the art as a matrix phase or metal matrix phase) can comprise of mono-modal or multi-modal particles having a size distribution smaller than the average particle size of the agglomerate. The metallic or semi-conductor material component can be silicon, aluminum, boron, beryllium, zirconium, hafnium, titanium, cobalt, nickel, tungsten, vanadium, niobium, tantalum, iron, chromium, copper or combinations thereof.

The preferred material that does not sublime is silicon. This material is commercially available. It is desired that the material component will plastify or liquefy, but not sublime, during the thermal spraying process.

The binder component of the agglomerates can be any type of binder commonly known in the industry. The binder can be any material that aids in the formation of the agglomerates. Some well known binders are polyvinyl acetate, polyvinyl pyrrolidone, hydroxyethylcellulose, hydroxypropyl cellulose, hydroxypropyl methycellulose, polymethacrylate, polyvinyl acetate, methylcellulose, carbonyl methylcellulose, ethylcellulose, microcrystalline cellulose, gums, starches, sugars, latex, lacquers, waxes, or combinations thereof. It is preferred that the binder contain carbon or silicon and that the binder be water soluble or a wax. Examples of the preferred binders are corn syrup available under the tradename KARO™ from Sysco, or carbon methylcellulose (CMC) available under the tradename METHOCEL A4C from DOW chemical.

Depending upon the final product desired, additional components may be incorporated into the agglomerates. The additional components, like the aforementioned components, can comprise mono-modal or multi-modal particles having a size distribution smaller than the average particle size of the agglomerate. One of the possible additional components can be an insoluble carbon such as anthracite, carbon black, graphite, carbon nanotubes, buckminsterfullerines or combinations thereof. Other additional components can be lubricants, glidants, flow aids, dispersants, surfactants or antifoaming agents, which will be discussed below. Other additional components may be other types of ceramic or matrix phase so as to modify the properties of the desired composite structure. Other examples of possible additives to the agglomerates are solid lubricant particles such as graphite, agents which form pores in the final ceramic composite structure, or materials that will enhance the tribological properties of the final ceramic composite structure. Alternatively, the solid lubricant, pore forming material or the tribological additives may be incorporated into the substrate onto which the ceramic containing agglomerates are sprayed as discussed below.

The amounts of the individual components in the agglomerates can be varied depending upon the desired use of the final ceramic containing composite structure. Typically the agglomerates will comprise about 20-99 weight percent of the ceramic component, preferably 30-97 weight percent and most preferably about 50-95 weight percent of the agglomerates. The agglomerates also typically can comprise about 15 weight percent or less of the binder, preferably about 10 weight percent or less of the binder and most preferably about 5 weight percent or less of the binder. The balance of the agglomerate comprises of the metallic or semi-conductor materials that do not sublime and any other additives. Typically the metallic or semi-conductor material comprises about 65 weight percent or less, preferably about 35 weight percent of less and most preferably about 20 weight percent or less.

The agglomerates can be made by any technique commonly known in the industry such as wet granulation techniques or dry granulation techniques. If a wet granulation technique is employed the granulation fluid for forming the wet mass may be water, an organic solvent or a combination of water and an organic solvent. The granulation fluid should be capable of dispersing the individual components of the agglomerates. A dispersant or surfactant may be employed in the wet granulation techniques to aid in the dispersion of the individual components of the agglomerates. An anti-foaming agent may also be employed during the wet granulation to prevent the creation of foam or bubbles during the mixing of the individual components with the granulation fluid.

In one embodiment of the present invention, the four main components of the agglomerate forming process: 1) the liquid; 2) the ceramic component that sublimes; 3) the metallic or semi-conductor material that does not sublime; and 4) a binder are mixed together to form a slurry or paste. The slurry or paste is then dried. Depending upon the consistency and/or viscosity of the slurry or paste, the mixture of the four main components can be dried by any number of methods. For example, if the slurry has a viscosity that allows it to be pumped, the slurry can be spray dried by spraying the slurry into a chamber and drying the sprayed slurry with the use of a drying gas such as air. A number of variations on the spray drying process are well known in the art and may also be used in the present invention. Examples of spray driers that can be used in the present invention include but are not limited to a Niro brand bottom spray drier or an APV model PSD52.

A second method for drying involves placing the slurry or paste into a cladding bowl or industrial mixer and mixing and drying the slurry or paste into a powder. Another method for drying involves casting the slurry or paste into a suitable container and drying in air, nitrogen, inert gas or vacuum to form a dried cake. The dried cake is then formed into powder using a suitable benefaction technique such as grinding or milling to achieve a powder with even dispersion of the individual components in the desired size distribution.

The size distribution of the agglomerates is not critical to the present invention as long as the agglomerates are free flowing and can be fed into a thermal spray apparatus. Experiments on the agglomerates have typically involved agglomerates that range in average size of about 1000 microns or less, preferably about 250 microns or less, and most preferably about 150 microns or less. The size distribution used will be dependent on the spray parameter used. The amount of powder fed into the process depends on the powder employed.

Another acceptable method for forming the agglomerates of the present invention involves the use of a fluidized bed. Typically the ceramic particles are placed into the product bowl of a fluidized bed. A solution, suspension or dispersion of the metallic or semi-conductor material that does not sublime, the binder and the granulation fluid are mixed together and sprayed into the fluidized bed to form the agglomerates. It is also possible to place the metallic or semi-conductor material that does not sublime into the product bowl of the fluidized bed and spray a solution, suspension or dispersion containing the ceramic component, binder and granulation fluid into the fluidized bed.

More preferably the ceramic component is placed in the vessel and a solution, suspension or dispersion containing the metallic component and binder is sprayed into the fluidized bed and clad onto the ceramic.

If a dry granulation technique is employed to create the agglomerates of the present invention, the individual components of the agglomerates are mixed together and compacted using a common press such as a roller compactor. Once the dry compressed mass is obtained it can be ground, milled or sieved to break the compressed mass into free flowing agglomerates.

It is also possible to form the agglomerates by selecting a wax or other binder material that has a low melting point, such as below 200° C., preferably below 100° C. The low melting binder material can be mixed with the other agglomerate components and the resulting mixture can than be heated and cooled to produce the agglomerates. The low melting binder can also be heated prior to the addition of the other agglomerate components then cooled to form the agglomerates. This heating and mixing can be accomplished with an extruder.

Regardless of the method employed to prepare the agglomerates, it may be desirable to size the agglomerates prior to feeding them into a thermal spray apparatus. The sizing can be performed using conventional techniques such as screening, air classification or tabling and jigging. It may also be desirable to add a lubricant, glidant or flow aid to the agglomerates such as talc, magnesium stearate or silicon dioxide to aid in obtaining a free flowing agglomerate and/or feeding the free flowing agglomerates into the thermal spray apparatus.

Once the free flowing agglomerates are prepared they (or the materials, in case that no agglomerates are formed) can be fed into a thermal spray apparatus for the creation of a ceramic containing composite structure such as a coating or structural deposit. A preferred thermal spray apparatus is a plasma spray apparatus using a high energy (greater than 40 kW) plasma gun with high gas flows. Examples of some plasma spray guns that can be used with the present invention include the Axial III available from Northwest Mettech, the Triplex Pro 200, Triplex II, 03CP and F4 available from Sulzer Metco. Other types of thermal spray apparatus can be used provided they can produce the necessary heat and velocity to form the desired structure. The other thermal processes that can be used with the present invention include Air Plasma Spray (APS), Vacuum Plasma Spray (VPS), Low Pressure Plasma Spray (LPPS), radio frequency plasma, plasma transfer arc, microwave, high velocity oxy-fuel (HVOF), high velocity air fuel (HVAF), high velocity liquid fuel (HVLF), combustion, induction or laser. All of the afore-mentioned methods are included within the term "thermal spray" as used in this specification.

In an embodiment of the present invention, a plasma gas stream is formed using a DC plasma gun. The plasma forming gas is typically a mixture of nitrogen and hydrogen, but may also include argon, helium, carbon dioxide or mixtures of the foregoing. Additionally a reactive gas, for instance a hydrocarbon gas such as methane, propane or butane may be introduced as part of the plasma forming gases or injected downstream of the plasma forming stage.

A gas stream with sufficient kinetic and thermal energy to heat and accelerate the feedstock agglomerates or materials toward a substrate may also be produced via a combustion thermal spray process such as flame spray or HVOF. In processes of this type, the working gases would consist of any combustible gas or liquid and oxygen. Reactive gases or liquids may also be introduced into the combustion process.

Although not necessary, to enhance the formation of the ceramic seal face layer and control any undesired side reactions that may occur during the formation of the ceramic seal face layer, it may be desirable to perform the spraying in a controlled atmosphere. This can be done by the use of an inert shroud gas to isolate the carrier media, such as the plasma plume itself, with entrained particles protected from the surrounding environment or otherwise to carry out the spray process inside a chamber that contains a primarily oxygen free environment with pressures that can vary from 1 mbar to pressures above or below atmospheric.

When spraying the agglomerates, the agglomerates are suspended in a carrier gas that is injected into a high energy gas stream effluent. The carrier gas may be an inert gas or a reactive gas as discussed above. The agglomerates can be injected axially into the high energy gas stream to provide a more uniform temperature and acceleration profile, however, the agglomerates may also be injected radially depending on the thermal spray process and/or gun manufacturer. The agglomerates may be injected both internally or externally of the gun body depending again on the thermal spray process and/or gun manufacturer. The rate at which the agglomerates are injected also depends again on the thermal spray process and/or gun manufacturer; however, typical rates have been about 20 g/min to about 200 g/min per injection point.

The ceramic seal face layer is produced when the agglomerates in the particle stream of the thermal spray apparatus coalesce on impact with a substrate or previously solidified particles. Movement of the substrate relative to the thermal spray gun determines deposition thickness and ultimately the shape and dimensions of the final ceramic seal face layer.

According to the present invention the method comprises the step of keeping plastic the metallic or semi-conductor material of the surface on the substrate during spraying. Thus, the metallic or semi-conductor material deposited on the substrate constitutes a soft or plastic layer in which the hard ceramic component particles are embedded and therewith bonded to the surface or the substrate, respectively.

Keeping the metallic or semi-conductor material plastic on the surface of the substrate is achieved for example by heating the substrate and/or the surface thereof. This heating may be performed by the hot gas stream or the beam of a thermal spray apparatus. By adjusting the power of the thermal spray apparatus it is possible to control the temperature of the substrate or its surface, respectively. In addition or alternatively an external heat source for heating the substrate or its surface can be provided. Of course, it is possible to determine the temperature of the surface by means of a temperature measuring device and to control the amount of heat accordingly. Measures and devices for heating the substrate or the material deposited on the substrate per se are known in the art and need no further explanation. In the most preferred embodiment the metallic or semi-conductor material of the surface is kept at a temperature between 0.75 times its melting temperature in Kelvin (K) and at most 50 K above its melting temperature.

An important example is plasma spraying of silicon carbide (SiC) as ceramic component and silicon (Si) as semiconductor material. These materials are sprayed on graphite for example. The substrate or its surface is heated such that the temperature is between 900° C. and 1450° C., preferably 1100° C. to 1400° C. and most preferred between 1300° C. and 1400° C. Thus, the Si remains plastic on the substrate so that the SiC particles stick. In addition, a localized sintering and reaction can take place removing all visible splat boundaries leading to an essentially monolithic structure. In this example the atmosphere should be primarily oxygen free, to avoid reaction of the Si with oxygen. Other suited substrate materials are for example molybdenum and iron (Fe)—nickel (Ni) alloys like Invar due to their low thermal expansion.

The substrate onto which the ceramic seal face is sprayed may be pretreated mechanically, thermally or chemically prior to the application of ceramic containing composite. The pretreatment may involve preheating, precleaning or precoating. The precoating could be an adhesive that increases the resulting bond between the sprayed material and the substrate or that acts in a manner to compensate for differences in the thermal coefficients of expansion between the substrate and sprayed material. In some cases, it may be possible to dope the substrate as a method of altering the properties of the spray formed deposit.

It may also be possible to spray a first layer of ceramic containing composite onto the substrate which employs a composition that will enhance or diminish the resulting bond with the substrate, then apply one or more additional layers of a sprayed material onto the first layer wherein the one or more layers have a different composition than the first layer. This multiple layer arrangement can be easily accomplished with the present invention by merely preparing two or more groups of agglomerates with different compositions and serially or simultaneously feeding the agglomerates with different compositions into the thermal spray apparatus.

Once the sprayed ceramic seal face layer is formed, post processing steps can be performed on the resulting structure. The post processing steps include but are not limited to, laser etching of the surface for cosmetic or functional purposes; laser cladding to add a top layer of material for cosmetic or functional purposes; annealing at elevated temperatures to relieve internal stress and/or further affecting the sprayed formation; grinding, lapping and polishing or cutting the surface for cosmetic or functional purposes or to bring dimensions into required tolerance. Electro-discharge machining (EDM) may also be employed as a finishing technique.

In an alternate embodiment, it is possible to create the necessary seal by mating an unfinished mechanical seal structure (either the stationary part or rotating part) with a finished or unfinished mechanical seal structure of a softer material, starting the device employing the mechanical seal structure and allowing the device to run into the mate until a seal is formed.

Subsequent to spraying and finishing the complete mechanical seal structure, the mechanical seal can be impregnated by any thermosetting epoxy, acrylite, or thermoplastic polymer in order to improve the integrity of the base and or face material.

The present invention will be described in detail by reference to the following examples that are provided for illustrative purposes. The following examples should not be construed as limiting the invention. Many variations that do not depart from the spirit or scope of the present invention will suggest themselves to those skilled in the art. All such obvious modifications are within the intended scope of the invention.

Especially, it is not necessary to form agglomerates prior to feeding the material to the thermal spray apparatus.

Example 1

Mono-Modal SiC and Mono-Modal Si

A thermal spray feedstock agglomerate composition was prepared with the following composition:

| COMPONENT | WEIGHT PERCENT |
| --- | --- |
| Mono-modal SiC | 72.1% |
| Mono-modal Si | 24.1% |
| Corn syrup (solids) | 3.8% |

The above described thermal spray feedstock agglomerate was prepared by mixing about 18000 g of mono-modal SiC exhibiting an average particle size of about 1 µm, about 6000 g of mono-modal Si exhibiting an average particle size of about 25 µm, 950 g (solids) of corn syrup.

The afore-mentioned components were mixed with water to form a slurry. The slurry was then spray dried using a commercial spray drier. The resulting agglomerates were free flowing, and had an average particle size of about 65 µm.

Example 2

Tri-Modal SiC and Bi-Modal Si

A thermal spray feedstock agglomerate composition is prepared with the following composition:

| COMPONENT | WEIGHT PERCENT |
| --- | --- |
| Tri-modal SiC | 72.6% |
| Bi-modal Si | 18.2% |
| Corn syrup (solids) | 3.6% |
| Carbon Methyl Cellulose (CMC) | 1.1% |
| Carbon Black | 4.5% |

The above described thermal spray feedstock agglomerate is prepared by mixing about 5760 g of tri-modal SiC, about 1440 g of bi-modal Si, about 285 g (solids) of corn syrup, about 90 g of commercially available CMC and about 360 g of commercially available carbon black. The tri-modal SiC component contains about 30-40 weight % based upon the total weight of the agglomerate composition of about 20 µm SiC, about 25-35 weight % based upon the total weight of the agglomerate composition of about 6 µm SiC and about 5-15 weight percent based upon the total weight of the agglomerate composition of about 1 µm SiC. The bi-modal Si component contains about 1-10 weight % based upon the total weight of the agglomerate composition of about 25 µm Si and about 10-20 weight % based upon the total weight of the agglomerate composition of about 6 µm Si.

The afore-mentioned components are mixed with water to form a slurry. The slurry is poured into pans and baked in an oven, forming a cake. The cake material was mechanically crushed and screened to form a powder. The average particle size of the agglomerates is about 50-95 µm.

Example 3

Tri-Modal SiC and Bi-Modal Si

A thermal spray feedstock agglomerate composition is prepared with the following composition:

| COMPONENT | WEIGHT PERCENT |
| --- | --- |
| Tri-modal SiC | 75% |
| Bi-modal Si | 17% |
| Corn syrup | 3% |
| Carbon Methyl Cellulose (CMC) | 1% |
| Nopcosperse | 1% |
| Carbon Black | 3% |

The above described thermal spray feedstock agglomerate is prepared by mixing about 22083 g of tri-modal SiC, about 5241 g of bi-modal Si, about 200 g of commercially available CMC, about 864 g (solids) of commercially available corn syrup, about 200 g of nopcosperse dispersant and about 874 g of commercially available carbon black. The afore-mentioned components are mixed with distilled water to form a slurry. The tri-modal SiC component contains about 35-45 weight % based upon the total weight of the agglomerate composition of about 20 µm SiC, about 30-40 weight % based upon the total weight of the agglomerate composition of about 6 µm SiC and about 5-15 weight % based upon the total weight of the agglomerate composition of about 1 µm SiC. The bi-modal Si component contains about 1-10 weight % based upon the total weight of the agglomerate composition of about 25 µm Si and about 10-20 weight % based upon the total weight of the agglomerate composition of about 6 µm Si.

The slurry is then spray dried using a commercial spray drier. The resulting agglomerates are free flowing and have an average particle size of 50-100 µm.

Example 4

Tri-Modal SiC and Bi-Modal Si

A thermal spray feedstock agglomerate composition was prepared with the following composition:

| COMPONENT | WEIGHT PERCENT |
| --- | --- |
| Tri-modal SiC | 75.9% |
| Bi-modal Si | 17.4% |
| Carbon Methyl Cellulose (CMC) | 2.2% |
| Carbon Black | 4.5% |

The above described thermal spray feedstock agglomerate was prepared by mixing about 7671 g of tri-modal SiC, about 1760 g of bi-modal Si, about 228 g of commercially available CMC, and 455 g of commercially available carbon black. The tri-modal SiC component contained about 38.2 weight % based upon the total weight of the agglomerate composition of about 20 µm SiC, about 30.6 weight % based upon the total weight of the agglomerate composition of about 6 µm SiC and about 7.1 weight % based upon the total weight of the agglomerate composition of about 1 µm SiC. The bi-modal Si component contained about 3.6 weight % based upon the total weight of the agglomerate composition of about 25 μm Si and about 13.8 weight % based upon the total weight of the agglomerate composition of about 6 μm Si.

The afore-mentioned components were mixed with distilled water to form a slurry. The slurry was then spray dried using a commercial spray drier. The resulting agglomerates are free flowing and have an average particle size of about 85 μm.

Example 5

Tri-Modal SiC and Bi-Modal Si

A thermal spray feedstock agglomerate composition is prepared with the following composition:

| COMPONENT | WEIGHT PERCENT |
| --- | --- |
| Tri-modal SiC | 82.6% |
| Bi-modal Si | 15.0% |
| Carbon Methyl Cellulose (CMC) | 2.4% |

The above described thermal spray feedstock agglomerate is prepared by mixing about 33022 g of tri-modal SiC, about 6000 g of bi-modal Si and 978 g of commercially available CMC. The tri-modal SiC component contains about 37-47 weight % based upon the total weight of the agglomerate composition of about 20 μm SiC, about 30-40 weight % based upon the total weight of the agglomerate composition of about 6 μm SiC and about 5-15 weight % based upon the total weight of the agglomerate composition of about 1 μm SiC. The bi-modal Si component contains about 1-14 weight % based upon the total weight of the agglomerate composition of about 25 μm Si and about 1-14 weight % based upon the total weight of the agglomerate composition of about 6 μm Si.

The slurry is then spray dried using a commercial spray drier. The resulting agglomerates are free flowing and have an average particle size of 50-100 μm.

Example 6

Mono-Modal SiC and Mono-Modal Si

A thermal spray feedstock agglomerate composition was prepared with the following composition:

| COMPONENT | WEIGHT PERCENT |
| --- | --- |
| Mono-modal SiC | 81.8% |
| Mono-modal Si | 14.4% |
| Corn syrup (solids) | 3.8% |

The above described thermal spray feedstock agglomerate was prepared by mixing about 14,280 g of mono-modal SiC exhibiting an average particle size of about 1 μm, about 2520 g of mono-modal Si exhibiting an average particle size of about 1 μm, about 665 g (solids) of corn syrup.

The afore-mentioned components were mixed with distilled water to form a slurry. The slurry was then spray dried using a commercial spray drier. The resulting agglomerates were free flowing, and had an average particle size of about 70 μm.

Example 7

The agglomerates prepared in Examples 1-6 can be axially injected into Plasma Spray apparatus. The plasma forming gas is a mixture of Nitrogen, Hydrogen and Argon. The plasma spray can be directed onto a graphite substrate rotating about an axis parallel to the spray direction that was in an inert chamber containing Nitrogen gas at ambient pressure. The thermal spray continues until approximately 0.001 inch to 0.25 inch of a ceramic seal face layer has been applied to the graphite substrate. The graphite substrates are commercially available from graphitestore.com and SGL Carbon Corporation.

Example 8

Blend of SiC and Si Powder

By blending SiC powder and Si powder a thermal spray feedstock composition was prepared with the following composition:

| COMPONENT | WEIGHT PERCENT |
| --- | --- |
| Mono-modal SiC | 87.0% |
| Mono-modal Si | 13.0% |

The above described thermal spray feedstock was prepared by mixing about 6770 g of mono-modal SiC exhibiting an average particle size of about 20 μm and about 2270 g of mono-modal Si exhibiting an average particle size of about 25 μm.

The powder blend was axially fed into a Plasma Spray apparatus. The plasma forming gas is a mixture of Nitogen and Argon. The plasma spray is directed onto a graphite substrate rotating about an axis perpendicular to the spray in a chamber containing Argon gas at ambient pressure. After about four minutes of spraying, a small deposit is formed on the graphite substrate.

Further thermal spray feedstock compositions are covered by the present invention and, in particular, every suitable combination of the aforementioned special embodiments of thermal spray feedstock compositions are covered by the present invention. Accordingly, it is understood that the present invention is also related to further methods of preparing a thermal spray feedstock composition as well as to further methods for forming a ceramic containing composite structure as defined in the respective method claims. It goes without saying that every suitable combination of the aforementioned special embodiments of methods for preparing a thermal spray feedstock composition as well as every suitable combination of the above explained special embodiments of methods for forming a ceramic containing composite structure is also covered by the present invention.

The invention claimed is:

1. A method for forming a mechanical seal structure comprising the steps of (i) forming a shaped substrate and (ii) applying a ceramic seal face layer to the substrate by thermal spraying further comprising the steps of (a) forming a free flowing agglomerate comprising:
  (i) 30 to about 97 weight percent silicon carbide (ii) silicon and
(iii) a carbon containing binder;
(b) feeding the free flowing agglomerate into a thermal spray apparatus,
(c) spraying the silicon carbide and silicon onto the substrate, whereby the silicon carbide and silicon deposit on the surface of the substrate, and
(d) keeping the deposited silicon on the substrate surface at a temperature which is at least 0.75 times the melting temperature in Kelvin of the silicon and at most 100 K above the melting temperature of the silicon during the spraying at least in the region where the silicon and silicon carbide actually strike the surface.

2. Method according to claim 1 wherein the spraying is conducted in at least one of a controlled atmosphere and at low pressure between 0.0001 bar and 1 bar.

3. Method according to claim 2 wherein the controlled atmosphere comprises at least one of a primarily oxygen free environment and at least one inert gas.

4. Method according to claim 1, wherein the carbon containing binder is at least one of polyvinyl acetate, polyvinyl pyrrolidone, hydroxyethylcellulose, hydroxypropyl cellulose, hydroxypropyl methycellulose, polymethacrylate, methylcellulose, ethylcellulose, microcrystalline cellulose, gums, starches, sugars, waxes, or combinations of the foregoing.

5. The method according to claim 4, wherein the carbon containing binder is selected from the group consisting of hydroxypropyl cellulose, hydroxypropyl methylcellulose, methylcellulose or combinations of the foregoing.

6. The method according to claim 4, wherein the carbon containing binder is a starch, sugar, wax or combination of the foregoing.

7. The method according to claim 4, wherein the carbon containing binder is water soluble.

8. Method according to claim 1 wherein the step of keeping the deposited silicon on the substrate surface at a temperature which is at least 0.75 times the melting temperature in Kelvin of the silicon and at most 100 K above the melting temperature of the silicon comprises a controlled heating of the surface by means of a thermal spray beam generated by the thermal spray apparatus.

9. Method according to claim 1 wherein the step of keeping the deposited silicon on the substrate surface at a temperature which is at least 0.75 times the melting temperature in Kelvin of the silicon and at most 100 K above the melting temperature of the silicon comprises transferring heat from an additional heat source to the substrate and/or the surface.

10. Method according to claim 1 wherein the thermal spray apparatus is plasma spray.

11. Method according to claim 1 wherein the thermal spray apparatus is one of an air plasma spray (APS), vacuum plasma spray (VPS), low pressure plasma spray (LPPS), radio frequency plasma, plasma transfer arc, microwave, high velocity oxy-fuel (HVOF), high velocity air fuel (HVAF), high velocity liquid fuel (HVLF), combustion, induction and laser.

12. The method of claim 1 wherein the spraying is conducted at ambient pressure.

13. The method of claim 1 wherein the substrate is graphite.

14. The method of claim 1 wherein the deposited silicon on the substrate surface is kept at a temperature at least 0.8 times the melting temperature in Kelvin of the silicon during the spraying.

15. The method of claim 1 wherein the deposited silicon on the substrate surface is kept at a temperature at most 50K above the melting temperature of the silicon during the spraying.

16. The method of claim 1 wherein the silicon carbide comprises 50-95 weight percent of the agglomerate.

17. The method of claim 1 wherein the silicon comprises about 65 weight percent or less of the agglomerate.

18. The method of claim 17 wherein the silicon comprises about 35 weight percent or less of the agglomerate.

19. The method of claim 18 wherein the silicon comprises about 20 weight percent or less of the agglomerate.

20. The method of claim 1 wherein the carbon containing binder comprises about 15 weight percent or less of the agglomerate.

21. The method of claim 20 wherein the carbon containing binder comprises about 10 weight percent or less of the agglomerate.

22. The method of claim 21 wherein the carbon containing binder comprises about 5 weight percent or less of the agglomerate.

23. The method of claim 1 wherein the agglomerate has an average particle size of 50-100 µm.

24. The method of claim 1 wherein the silicon carbide has an average particle size of about 20 µm or less and the silicon has an average particle size of 25 µm or less.

25. A method for forming a mechanical seal structure comprising the steps of (i) forming a shaped substrate and (ii) applying a ceramic seal face layer to the substrate by thermal spraying further comprising the steps of:
(a) forming a free flowing agglomerate having an average particle size of 50-100 µm comprising:
(i) 30 to about 97 weight percent silicon carbide based on the total weight of the agglomerate wherein the silicon carbide has an average particle size of about 20 µm or less;
(ii) silicon, where the silicon is present, and also provided in an amount of about 35 weight percent or less of silicon based upon the total weight of the agglomerate wherein the silicon has an average particle size of about 25 µm or less; and
(iii) carbon containing binder, where the carbon containing binder is present, and also provided in an amount of about 10 weight percent or less based upon the total weight of the agglomerate of the carbon containing binder;
(b) feeding the free flowing agglomerate into a thermal spray apparatus,
(c) spraying the silicon carbide and silicon onto the substrate, whereby the silicon carbide and silicon deposit on the surface of the substrate, and
(d) keeping the deposited silicon on the substrate surface at a temperature which is at least 0.75 times the melting temperature in Kelvin of the silicon and at most 100 K above the melting temperature of the silicon during the spray at least in the region where the silicon and silicon carbide actually strike the surface.

26. The method of claim 25 wherein the deposited silicon on the substrate surface is kept at a temperature at least 0.8 times the melting temperature in Kelvin of the silicon and at most 50 K above the melting temperature of the silicon during the spraying.

* * * * *